United States Patent
Cutler et al.

(10) Patent No.: US 10,789,685 B2
(45) Date of Patent: Sep. 29, 2020

(54) PRIVACY IMAGE GENERATION

(71) Applicant: Microsoft Technology Licensing, LLC, Redmond, WA (US)

(72) Inventors: Ross Cutler, Redmond, WA (US); Ramin Mehran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/111,398

(22) Filed: Aug. 24, 2018

(65) Prior Publication Data
US 2018/0365809 A1    Dec. 20, 2018

Related U.S. Application Data

(63) Continuation of application No. 15/638,923, filed on Jun. 30, 2017, now Pat. No. 10,181,178, which is a (Continued)

(51) Int. Cl.
  *G06T 5/00* (2006.01)
  *H04N 7/15* (2006.01)
  (Continued)

(52) U.S. Cl.
  CPC ............. *G06T 5/002* (2013.01); *G06T 7/11* (2017.01); *G06T 7/50* (2017.01); *H04N 5/23216* (2013.01);
  (Continued)

(58) Field of Classification Search
  CPC ... G06T 5/002; G06T 7/11; G06T 7/50; G06T 2207/10012; H04N 5/23216;
  (Continued)

(56) References Cited

U.S. PATENT DOCUMENTS

| 5,781,198 A | 7/1998 | Korn |
| 5,870,103 A | 2/1999 | Luo |

(Continued)

FOREIGN PATENT DOCUMENTS

| CN | 101276409 A | 10/2008 |
| JP | 2006-013856 A | 1/2006 |

(Continued)

OTHER PUBLICATIONS

"Office Action Issued in Korean Patent Application No. 10-2015-7016298", dated Aug. 16, 2019, 14 Pages.
(Continued)

*Primary Examiner* — Hemant S Patel
(74) *Attorney, Agent, or Firm* — Schegman Lundberg & Woessner, P.A.

(57) ABSTRACT

A privacy image generation system may use a light field camera that includes an array of cameras or an RGBZ camera(s)) is used to capture images and display images according to a selected privacy mode. The privacy mode may include a blur background mode that can be automatically selected based on the meeting type, participants, location, and device type. A region of interest and/or an object(s) of interest (e.g. one or more persons in a foreground) is determined and the privacy image generation system is configured to clearly show the region/object of interest and obscure or replace the background by combining multiple images. The displayed image includes the region/object(s) of interest clearly shown (e.g. in focus) and any objects in a background of the combined image shown having a limited depth of field (e.g. blurry/not in focus) and/or blurred due to the combination of the multiple images.

20 Claims, 13 Drawing Sheets

Related U.S. Application Data continuation of application No. 14/810,210, filed on Jul. 27, 2015, now Pat. No. 9,729,824, which is a continuation of application No. 13/723,008, filed on Dec. 20, 2012, now Pat. No. 9,124,762.

(51) Int. Cl.
| | | |
|---|---|---|
| *H04N 13/207* | (2018.01) | |
| *G06T 7/11* | (2017.01) | |
| *H04N 7/14* | (2006.01) | |
| *G06T 7/50* | (2017.01) | |
| *H04N 5/232* | (2006.01) | |

(52) U.S. Cl.
CPC ..... *H04N 5/23229* (2013.01); *H04N 5/23293* (2013.01); *H04N 7/142* (2013.01); *H04N 7/147* (2013.01); *H04N 7/15* (2013.01); *H04N 13/207* (2018.05); *G06T 2207/10012* (2013.01); *H04N 2213/005* (2013.01)

(58) Field of Classification Search
CPC ........... H04N 5/23229; H04N 5/23293; H04N 7/142; H04N 7/147; H04N 7/15; H04N 13/207; H04N 2213/005
USPC ............................................ 348/14.01–14.16
See application file for complete search history.

(56) References Cited

U.S. PATENT DOCUMENTS

| | | | |
|---|---|---|---|
| 6,067,399 A | 5/2000 | Berger | |
| 6,295,392 B1 | 9/2001 | Gregory et al. | |
| 6,441,865 B1 | 8/2002 | Hailey | |
| 6,490,006 B1 | 12/2002 | Monjo | |
| 6,915,011 B2 | 7/2005 | Loui et al. | |
| 6,937,266 B2 | 8/2005 | Rui et al. | |
| 7,259,784 B2 | 8/2007 | Cutler | |
| 7,298,392 B2 | 11/2007 | Cutler | |
| 7,362,350 B2 | 4/2008 | Cutler | |
| 7,366,359 B1 | 4/2008 | Davey et al. | |
| 7,397,504 B2 | 7/2008 | Cutler | |
| 7,428,000 B2 | 9/2008 | Cutler et al. | |
| 7,495,694 B2 | 2/2009 | Cutler | |
| 7,512,262 B2 * | 3/2009 | Criminisi ........... | G06K 9/00241 |
| | | | 382/106 |
| 7,576,766 B2 | 8/2009 | Cutler | |
| 7,593,057 B2 | 9/2009 | Yee et al. | |
| 7,598,975 B2 | 10/2009 | Cutler | |
| 7,602,412 B2 | 10/2009 | Cutler | |
| 7,692,696 B2 | 4/2010 | Steinberg et al. | |
| 7,697,839 B2 | 4/2010 | Cutler | |
| 7,720,572 B2 | 5/2010 | Ziegler et al. | |
| 7,742,650 B2 | 6/2010 | Xu et al. | |
| 7,768,544 B2 * | 8/2010 | Cutler ................... | H04N 5/2628 |
| | | | 348/36 |
| 7,782,357 B2 | 8/2010 | Cutler | |
| 7,783,075 B2 | 8/2010 | Zhang et al. | |
| 7,812,882 B2 | 10/2010 | Cutler | |
| 7,817,911 B2 | 10/2010 | Tanaka et al. | |
| 7,834,894 B2 | 11/2010 | Swanson et al. | |
| 7,852,369 B2 | 12/2010 | Cutler et al. | |
| 7,911,516 B2 | 3/2011 | Iijima et al. | |
| 7,990,429 B2 * | 8/2011 | Saito ....................... | H04N 5/232 |
| | | | 348/222.1 |
| 8,063,929 B2 | 11/2011 | Kurtz et al. | |
| 8,130,257 B2 | 3/2012 | Cutler | |
| 8,134,637 B2 | 3/2012 | Rossbach et al. | |
| 8,155,471 B2 * | 4/2012 | Ho ......................... | H04N 5/232 |
| | | | 382/260 |
| 8,165,416 B2 | 4/2012 | Cutler | |
| 8,212,895 B2 | 7/2012 | Nakamura | |
| 8,225,208 B2 | 7/2012 | Sprang et al. | |
| 8,254,679 B2 | 8/2012 | Marchesotti | |
| 8,265,793 B2 | 9/2012 | Cross et al. | |
| 8,305,448 B2 * | 11/2012 | Yoda ...................... | G06T 11/60 |
| | | | 348/152 |
| 8,363,085 B2 | 1/2013 | Michrowski et al. | |
| 8,451,339 B2 | 5/2013 | Solomon | |
| 8,488,896 B2 * | 7/2013 | Shi ........................... | G06T 5/002 |
| | | | 348/586 |
| 8,493,431 B2 | 7/2013 | Liu et al. | |
| 8,498,478 B2 | 7/2013 | Wu et al. | |
| 8,526,632 B2 | 9/2013 | Cutler | |
| 8,596,541 B2 | 12/2013 | Chiu et al. | |
| 8,619,177 B2 | 12/2013 | Perwass et al. | |
| 8,639,020 B1 | 1/2014 | Kutliroff et al. | |
| 8,721,197 B2 | 5/2014 | Miyahara et al. | |
| 8,724,919 B2 * | 5/2014 | Pillman ................... | G06T 5/003 |
| | | | 382/173 |
| 8,752,197 B2 | 6/2014 | Bolle et al. | |
| 9,020,825 B1 | 4/2015 | Garber | |
| 9,124,762 B2 | 9/2015 | Cutler et al. | |
| 9,154,684 B2 | 10/2015 | Lee et al. | |
| 9,281,727 B1 | 3/2016 | Coley et al. | |
| 9,282,301 B1 | 3/2016 | Cederlof | |
| 9,294,746 B1 | 3/2016 | Cederlof | |
| 9,729,824 B2 * | 8/2017 | Cutler ........................ | G06T 7/50 |
| 10,181,178 B2 * | 1/2019 | Cutler ........................ | G06T 7/50 |
| 2003/0058939 A1 | 3/2003 | Lee et al. | |
| 2004/0202382 A1 | 10/2004 | Pilu | |
| 2006/0206911 A1 | 9/2006 | Kim et al. | |
| 2007/0160289 A1 | 7/2007 | Lipton et al. | |
| 2007/0286520 A1 * | 12/2007 | Zhang ................. | G06K 9/00228 |
| | | | 382/264 |
| 2008/0259154 A1 * | 10/2008 | Garrison .................. | H04N 7/14 |
| | | | 348/14.01 |
| 2008/0297587 A1 | 12/2008 | Kurtz et al. | |
| 2008/0298571 A1 | 12/2008 | Kurtz et al. | |
| 2008/0317339 A1 | 12/2008 | Steinberg et al. | |
| 2009/0207282 A1 * | 8/2009 | Sasaki ..................... | H04N 5/232 |
| | | | 348/240.3 |
| 2009/0315915 A1 | 12/2009 | Dunn et al. | |
| 2010/0073568 A1 | 3/2010 | Van ostrand et al. | |
| 2010/0103175 A1 | 4/2010 | Okutomi et al. | |
| 2011/0038536 A1 | 2/2011 | Gong | |
| 2011/0076003 A1 | 3/2011 | Cho et al. | |
| 2011/0169921 A1 * | 7/2011 | Lee ...................... | H04N 5/23212 |
| | | | 348/46 |
| 2012/0007939 A1 * | 1/2012 | Michrowski ........... | H04N 7/147 |
| | | | 348/14.07 |
| 2012/0019688 A1 * | 1/2012 | Bugnariu .............. | H04N 5/2621 |
| | | | 348/239 |
| 2012/0105668 A1 | 5/2012 | Velarde et al. | |
| 2012/0133746 A1 | 5/2012 | Bigioi et al. | |
| 2012/0140066 A1 | 6/2012 | Lin | |
| 2012/0154582 A1 | 6/2012 | Johnson et al. | |
| 2013/0050395 A1 | 2/2013 | Paoletti et al. | |
| 2013/0083997 A1 | 4/2013 | Matthews | |
| 2013/0127823 A1 | 5/2013 | Diverdi et al. | |
| 2013/0176458 A1 | 7/2013 | Van dalen et al. | |
| 2013/0194375 A1 | 8/2013 | Michrowski et al. | |
| 2013/0222633 A1 | 8/2013 | Knight et al. | |
| 2013/0242057 A1 | 9/2013 | Hong et al. | |
| 2013/0243313 A1 | 9/2013 | Civit et al. | |
| 2014/0003662 A1 * | 1/2014 | Wang ................. | G06K 9/00268 |
| | | | 382/103 |
| 2014/0125810 A1 | 5/2014 | D'amico et al. | |
| 2014/0176663 A1 | 6/2014 | Cutler et al. | |
| 2015/0058709 A1 | 2/2015 | Zaletel | |
| 2015/0334348 A1 | 11/2015 | Cutler et al. | |
| 2017/0301067 A1 | 10/2017 | Cutler et al. | |

FOREIGN PATENT DOCUMENTS

| | | |
|---|---|---|
| JP | 2006013856 A | 1/2006 |
| JP | 2010-525667 A | 7/2010 |
| JP | 2010525667 A | 7/2010 |
| JP | 2011176827 A | 9/2011 |
| JP | 2011176827 A | 9/2011 |
| JP | 4942221 B2 | 5/2012 |
| JP | 2012-525028 A | 10/2012 |
| JP | 2012525028 A | 10/2012 |

(56) References Cited

FOREIGN PATENT DOCUMENTS

| JP | 2012-249125 A | 12/2012 |
|---|---|---|
| JP | 2012249125 A | 12/2012 |
| KR | 20030026528 A | 4/2003 |
| KR | 20080044379 A | 5/2008 |
| KR | 20080044379 A | 5/2008 |
| KR | 20100096247 A | 9/2010 |
| KR | 20100096247 A | 9/2010 |
| WO | 2008050904 A1 | 5/2008 |
| WO | WO-2008/050904 A1 | 5/2008 |
| WO | WO-2009/081307 A1 | 7/2009 |
| WO | 2011052064 A1 | 5/2011 |
| WO | WO-2011/052064 A1 | 5/2011 |
| WO | 2012001947 A1 | 1/2012 |
| WO | WO-2012/001947 A1 | 1/2012 |

OTHER PUBLICATIONS

"Summons to Attend Oral Proceedings Issued in European Patent Application No. 13821749.2", dated Mar. 21, 2019, 5 Pages.

"Image rectification", Retrieved From: https://en.wikipedia.org/wiki/Image_rectification, Retrieved Date: Sep. 11, 2019, 3 Pages.

Ng, et al., "Light Field Photography with a Hand-held Plenoptic Camera", Published in Computer Science Technical Report CSTR, vol. 2, Issue 11, Apr. 20, 2005, pp. 1-11.

"International Search Report and Written Opinion Issued in PCT Application No. PCT/US2013/076647", dated Apr. 30, 2014, 11 Pages.

"International Preliminary Report on Patentability Issued in PCT Application No. PCT/US2013/076647", dated Mar. 16, 2015, 8 Pages.

"Second Written Opinion Issued in PCT Application No. PCT/US2013/076647", dated Dec. 17, 2014, 7 Pages.

"Final Office Action Issued in U.S. Appl. No. 13/723,008", dated Dec. 4, 2014, 9 Pages.

"Non Final Office Action Issued in U.S. Appl. No. 13/723,008", dated Jul. 22, 2014, 8 Pages.

"Notice of Allowance Issued in U.S. Appl. No. 13/723,008", dated Apr. 22, 2015, 10 Pages.

"Office Action Issued in European Patent Application No. 13821749.2", dated Oct. 18, 2017, 7 Pages.

"Office Action Issued in Japanese Patent Application No. 2015549724", dated Dec. 5, 2017, 9 Pages.

"Final Office Action Issued in Japanese Patent Application No. 2015549724", dated Apr. 17, 2018, 7 Pages.

"Final Office Action Issued in U.S. Appl. No. 14/810,210", dated Sep. 15, 2016, 10 Pages.

"Non Final Office Action Issued in U.S. Appl. No. 14/810,210", dated Apr. 14, 2016, 24 Pages.

"Notice of Allowance Issued in U.S. Appl. No. 14/810,210", dated Apr. 12, 2017, 9 Pages.

"First Office Action and Search Report Issued in Chinese Patent Application No. 201380067243.0", dated Aug. 2, 2017, 10 Pages.

"Non Final Office Action Issued in U.S. Appl. No. 15/638,923", dated Feb. 23, 2018, 12 Pages.

"Final Office Action Issued in U.S. Appl. No. 15/638,923", dated Jun. 25, 2018, 15 Pages.

"First Office Action and Search report Issued in Chinese Patent Application No. 201810100700.6", (w/ English Translation), dated Dec. 2, 2019, 25 Pages.

"First Office Action and Search Report Issued in Chinese Patent Application No. 201810100712.9", (w/ English Translation), dated Dec. 2, 2019, 24 Pages.

"Office Action Issued in Japanese Patent Application No. 2015-549724", dated Oct. 29, 2019, 7 Pages.

"Office Action Issued in Korean Patent Application No. 10-2015-7016298", dated Feb. 7, 2020, 11 Pages.

"Office Action Issued in Japan Patent Application No. 2015-549724", dated Mar. 10, 2020, 5 Pages.

* cited by examiner

PRIVACY IMAGE GENERATION

CROSS-REFERENCE TO RELATED APPLICATIONS

This application is a continuation application of, claims the benefit of and priority to previously filed U.S. patent application Ser. No. 15/638,923 filed Jun. 30, 2017, which application is a continuation of, claims the benefit of and priority to previously filed U.S. patent application Ser. No. 14/810,210 filed Jul. 27, 2015, issued as U.S. Pat. No. 9,729,824 on Aug. 8, 2017, entitled "PRIVACY CAMERA", which is a continuation of, claims the benefit of and priority to previously filed U.S. patent application Ser. No. 13/723,008 filed Dec. 20, 2015, issued as U.S. Pat. No. 9,124,762 on Jun. 26, 2014, entitled "PRIVACY CAMERA", which are hereby incorporated by reference in their entireties.

BACKGROUND

Video conferencing is becoming more popular both at home and at work. Many users, however, may not wish to have their background in a shared work or home environment clearly visible to other participants. For example, the background may be messy, distracting, and/or include confidential information, and the like. While some video conferencing systems may use a background replacement (e.g. green screen/static background) or include a blurring capability, these methods may be difficult to implement (e.g., require a green screen) or may adversely impact a display of content in a scene (e.g., have significant image artifacts).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A privacy image generation system may obtain multiple images, for example from a light field camera that includes an array of cameras or an RGBZ (RGB+ depth) camera(s)) is used to capture images and display images according to a selected privacy mode. The privacy mode may include a blur background mode and a background replacement mode. A region of interest and/or an object(s) of interest (e.g. one or more persons in a foreground) is determined and the privacy image generation system is configured (e.g. depending on the type of camera) to clearly show the region/object of interest and the background according to the selected privacy mode. The displayed image includes the region/object(s) of interest clearly shown (e.g. in focus) and any objects in a background of the combined image shown having a limited depth of field (e.g. blurry/not in focus) and/or the background replaced with another image and/or fill. The privacy image generation system may also be used to determine a depth estimate for object in a scene.

DETAILED DESCRIPTION

Figure 1:
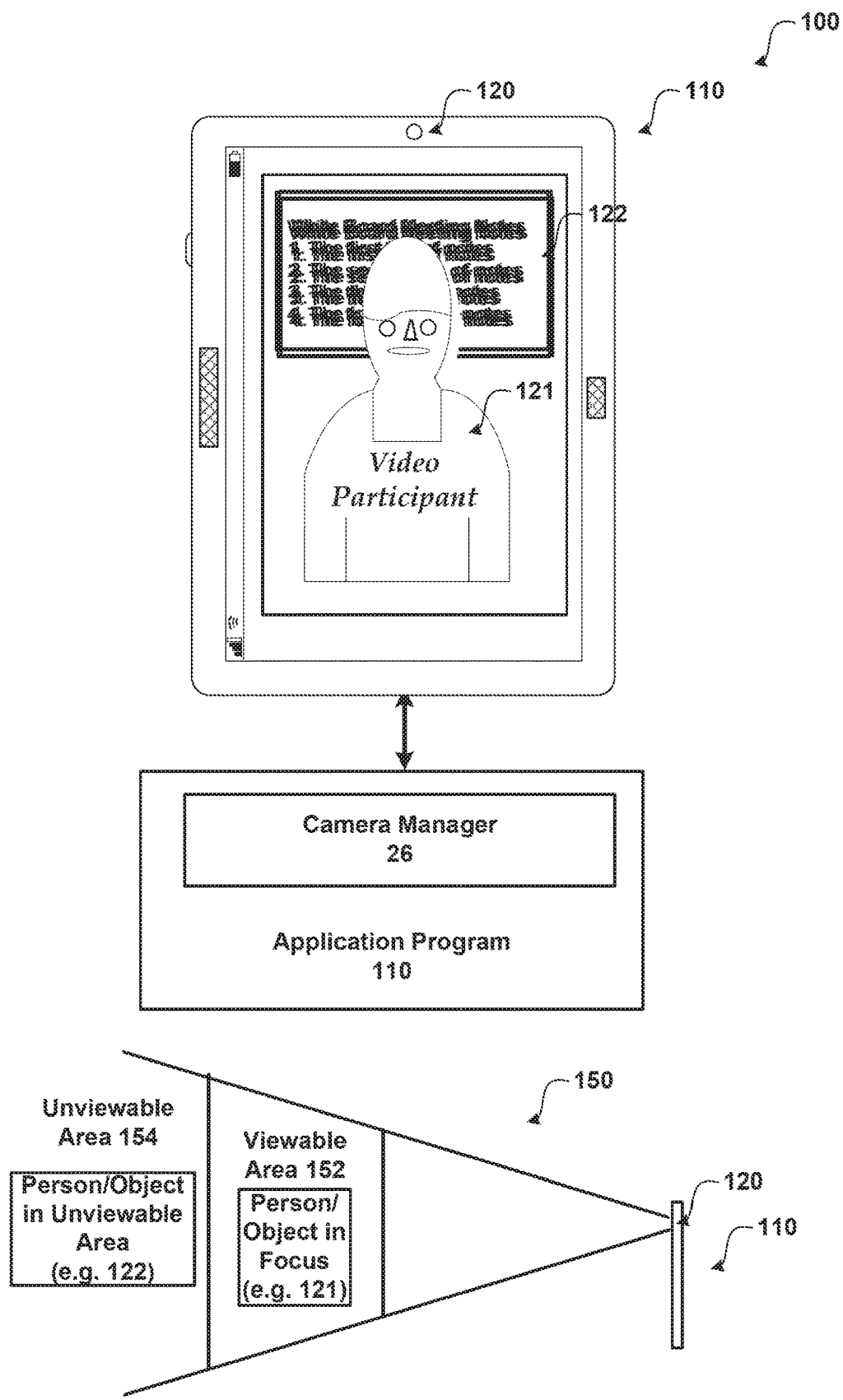
FIG. 1 shows a system for using a privacy image generation system according to example embodiments.

Referring now to the drawings, in which like numerals represent like elements, various embodiment will be described.

FIG. 1 shows a system for using a privacy camera. As illustrated, system 100 includes application program 110, camera manager 26 and touch screen input device/display 110 including a privacy camera 120.

In order to facilitate communication with the camera manager 26, one or more callback routines, may be implemented. According to one embodiment, application program 110 is a video conferencing application, such as MICROSOFT LYNC. The application program may be other programs that utilize an imaging feature using a privacy mode. As illustrated, application program 110 is configured to receive input from a touch-sensitive input device 110 and/or other input devices. For example, voice input, keyboard input (e.g. a physical keyboard and/or SIP), video-based input, and the like. For example, camera manager 26 may provide information to application 110 in response to a user's gesture selecting a user interface element, selecting a region/object of interest, interacting with content and other touch-based gestures. For example, gestures may include, but are not limited to: a pinch gesture; a stretch gesture; a select gesture (e.g. a tap action on a displayed element); a select and hold gesture (e.g. a tap and hold gesture received on a displayed element); a swiping action and/or dragging action; and the like.

System 100 as illustrated comprises a touch screen input device/display 110 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Privacy camera 120 is configured to record images and includes a privacy mode that displays a region/object(s) of interest in focus and other objects, such as objects in a background, not in focus (e.g. blurred) and/or the background replaced with an image/fill. According to an embodiment, privacy camera 120 is a light field (plenoptic) camera that uses a microlens array of cameras (e.g. 3×2, 3×3, . . . ) to capture a 4D light field of a scene (See FIG. 2 for exemplary arrays of cameras). Privacy camera 120 may also be implemented using other sensors/camera(s). For example, privacy camera 120 may be an RGBZ camera (a single sensor RGBZ, a two sensor RGB+ depth such as MICROSOFT KINECT, and the like). According to an embodiment, camera manager 26 rectifies the images obtained from the different cameras of the light field camera and determines a region/object of interest (e.g. one or more persons in a foreground). Camera manager 26 then configures the privacy camera 120 to have a limited depth of field that includes the detected region/object(s) of interest. According to an embodiment, after configuring privacy camera 120, a viewable area 152 is created in which object(s) that are within the viewable area are shown clearly (e.g. video participant 121) and object that are within the unviewable area 154 are shown out of focus due to a limited depth of field (e.g. blurry) such as whiteboard 122 that is shown behind the video participant 121. According to another embodiment, the background may be replaced with an image (e.g. user selected and/or predetermined and/or a fill (e.g. an average of the background). Camera manager 26 combines the images from the different cameras to create a single image that includes the objects of interest clearly shown (e.g. in focus) and any objects in a background shown blurry (e.g. not in focus) and/or the background replaced with the fill/image. When multiple cameras are used, the objects in the background appear blurred due to the distance between the different camera sensors. Instead of attempting to use background segmentation to blur the background, the combination of the different images obtained from the light field camera creates the blurring effect. Generally, the more cameras that are included in the light field, the more the objects in the unviewable area 150 (e.g. the background) appear blurred (See FIG. 3). The privacy camera 120 may also be used by the camera manager to determine a depth estimate for object in a scene. For example, a pair of the cameras in the light field may be used to determine a depth estimate. Another distance measuring device may be used to determine the depth estimate (e.g. measures time of flight). The light camera also provides a better signal to noise ratio (SNR) as compared to a single camera used by a computing device such as typically included on a slate device, a mobile phone, a desktop computer and the like. The bandwidth used may also be reduced due to the background blur and/or background replacement. According to an embodiment, a user may select different privacy modes using a user interface element (e.g. buttons, slider) to change an amount of detail shown in the background and/or select the fill/image used in the display of the background. More details are provided below.

Figure 2:
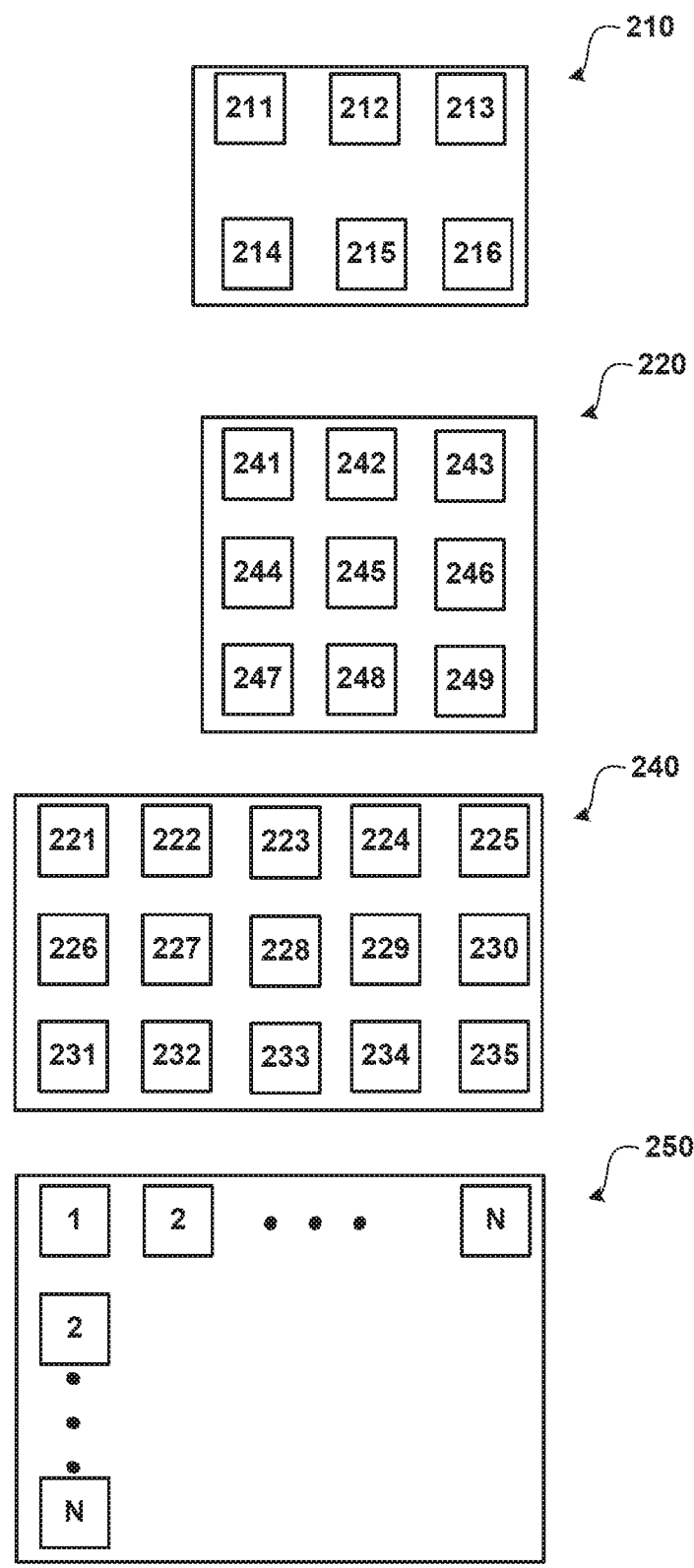
FIG. 2 shows an exemplary arrangement of an array of cameras used in a light field camera according to example embodiments.

FIG. 2 shows an exemplary arrangement of an array of cameras used in a light field camera. As illustrated, FIG. 2 shows array 210, array 220, array 240 and array 250.

According to an embodiment, the cameras are OV7690 VGA image sensors from OMNIVISION having an optical format of ⅓ inch that are each sized 2.5×2.5×2.5 mm. Other cameras may be used. For example, a 720p camera such as the OMNIVISION OVM2722 that are each sized 4.0×3.0×2.5 mm may also be used. Generally, the cameras are selected based on a desired resolution, size, and price point. A Bayer filter may be used and/or some other filter (e.g. mix of R, G, B, W). The array of cameras fit into a small area and may be disposed within a frame of today's common electronic computing devices (e.g. notebooks, tablets, phones, desktop webcams, and the like). Further, these different cameras are typically inexpensive.

Array 210 shows a 3×2 array of six cameras (211-216) disposed on a base. According to an embodiment, the base used by the different arrays is less than 30 mm×30 mm such that it may be easily incorporated into a mobile computing device. According to an embodiment, the six cameras are arranged in an array having a total width of approximately 20 mm from the center of camera 211 to the center of camera 213 and a height of approximately 10 mm from the center of camera 211 to the center of camera 214. Array 210 may be configured for small portable electronic devices such as notebooks, tablets and/or phones.

Array 220 shows a 3×3 array of six cameras (241-249). According to an embodiment, the nine cameras are arranged in an array having a total width of approximately 20 mm from the center of camera 241 to the center of camera 243 and a height of approximately 20 mm from the center of camera 241 to the center of camera 247. According to an embodiment, array 220 may be configured for a slightly larger electronic device such as a desktop webcam.

Array 230 shows a 5×3 array of six cameras (221-235). According to an embodiment, the fifteen cameras are arranged in an array having a total width of approximately 30 mm from the center of camera 221 to the center of camera 225 and a height of approximately 20 mm from the center of camera 221 to the center of camera 231.

Array 230 shows a N×N array of cameras (1-N). According to an embodiment, the cameras are arranged in an array based on a desired width and height for the cameras.

Each camera in the arrays is configured to provide an image to camera manager 26. Since multiple cameras are included within an array, a failure rate of pixels within one or more of the cameras may be compensated for based on the other cameras in the array. One or more of the cameras may also fail within the array while still providing a privacy mode.

Figure 3A:
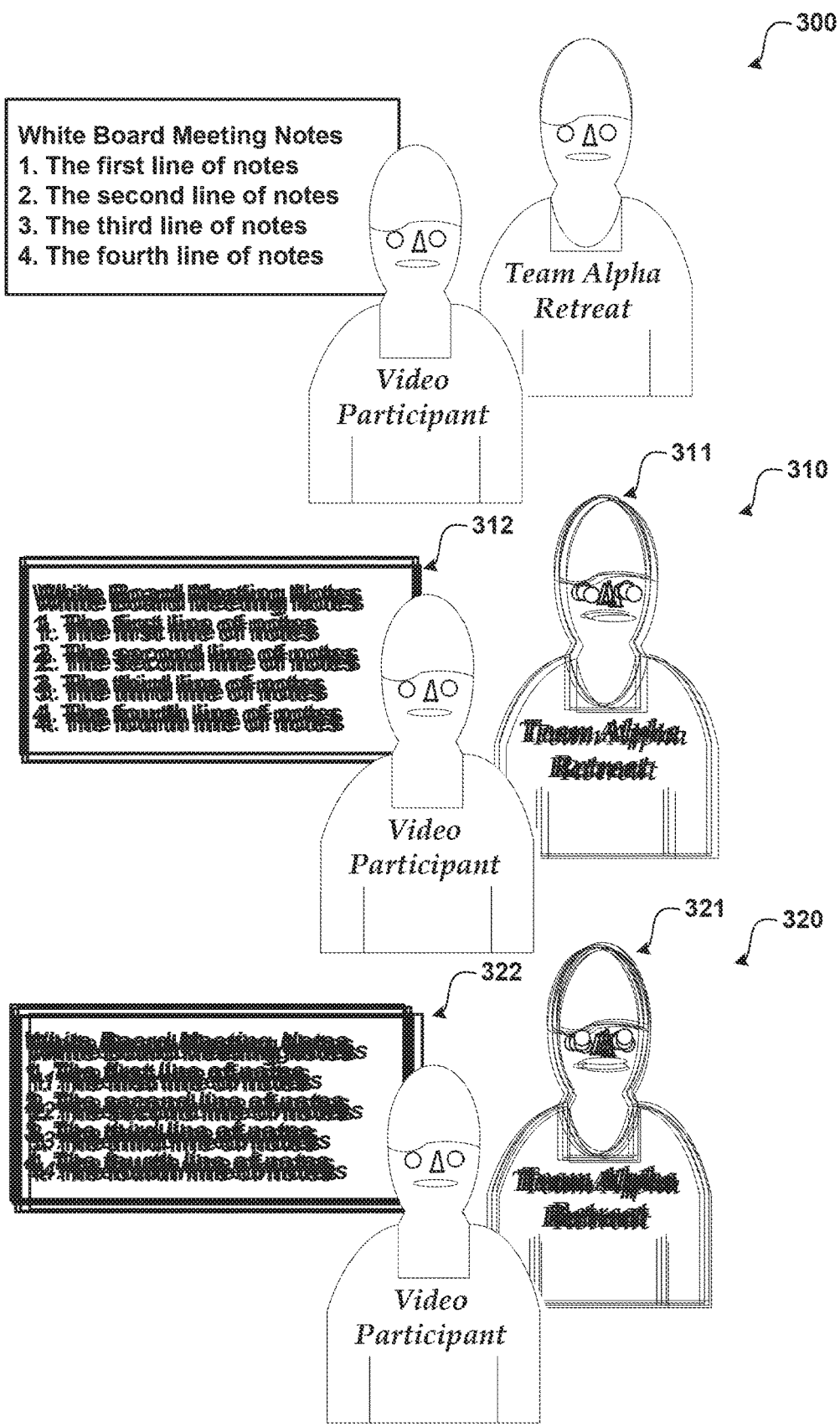
FIGS. 3A and 3B illustrates example displays showing a non-privacy mode and a privacy mode.
Figure 3B:
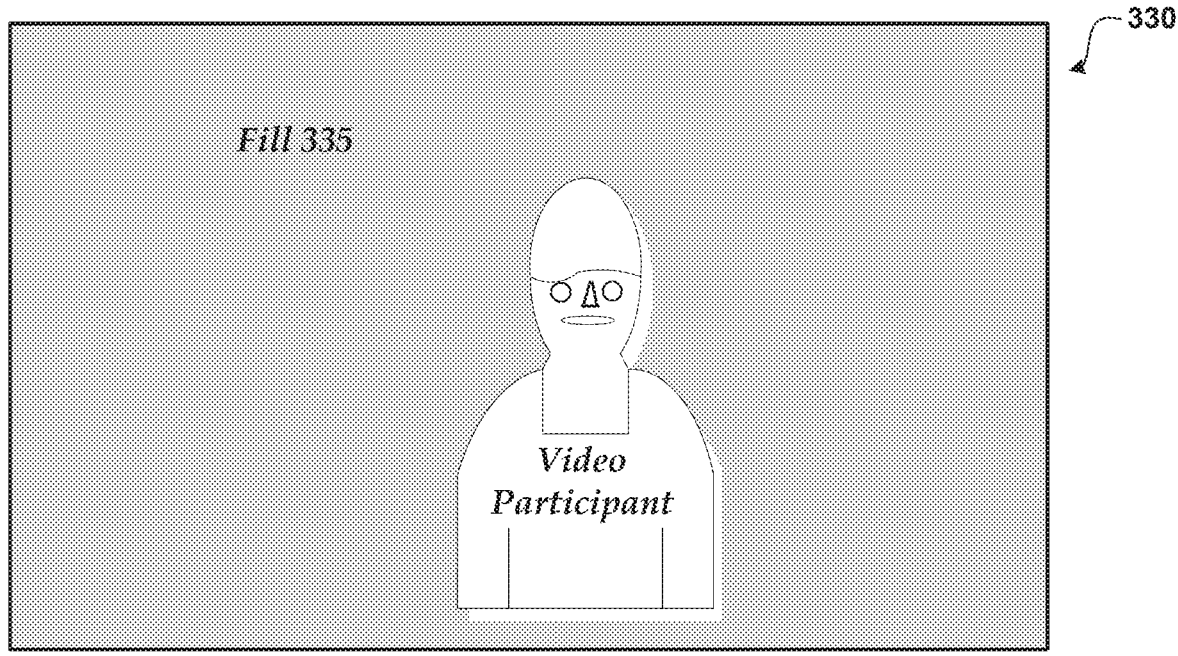
Figure 3B:
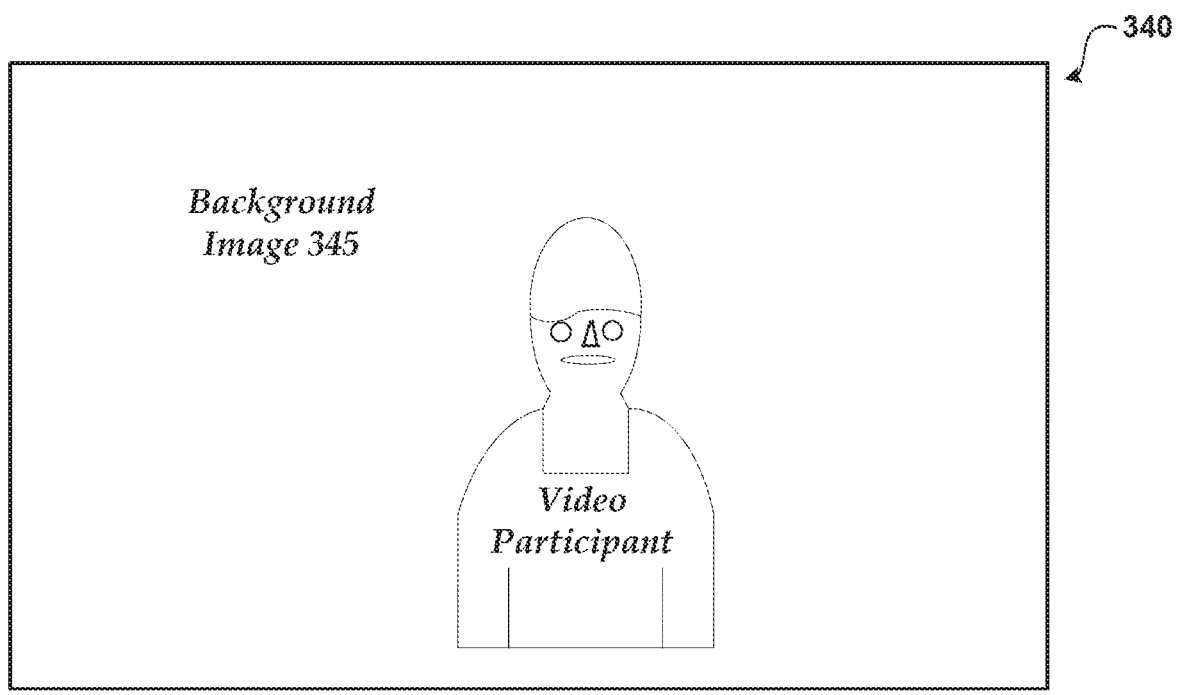

FIG. 3A and FIG. 3B illustrates exemplary displays showing a non-privacy mode and a privacy mode. As illustrated, FIG. 3A includes display 300, display 310 and display 310.

Display 300 shows an exemplary display showing an image of a scene without having the privacy mode active for a camera. As can be seen, each of the objects in the scene is clearly visible and legible.

Display 310 shows an exemplary scene displayed using a privacy mode. As can be seen the objects in the background (311, 312) are not shown in focus (e.g. blurred) due to the limited depth of field as compared to the object of interest (video participant).

Display 320 shows an exemplary scene displayed using a privacy mode. As can be seen the objects in the background (321, 322) are shown not in focus as compared to the object of interest (video participant). The background objects in display 320 appear more blurred as compared to the background objects in display 310. Using a larger array of cameras in a privacy camera and/or having a different spacing of the cameras in the array may be used to produce a larger blurring effect.

FIG. 3B shows replacing the background with a fill and an image. As illustrated, FIG. 3B includes display 330 and display 340.

Display 330 shows an exemplary scene displayed using a privacy mode with the background shown with a fill 335. As can be seen, the objects in the background (e.g. see 311, 312 in Display 310) are covered by the fill 335 while leaving the object of interest (video participant) clearly shown. According to an embodiment, fill 335 is an average of the background objects. Other fill/fill patterns may be used. For example, a predefined and/or user selected fill patterns may be selected (e.g. automatically/manually).

Display 340 shows an exemplary scene displayed using a privacy mode with the background replaced with a background image 345. As can be seen, the objects in the background (e.g. see 311, 312 in Display 310) are covered by the background image 345 while leaving the object of interest (video participant) clearly shown. Background image 345 may be determined automatically/manually. For example, a user may select a background image 345. Different background images and/or fills may be used. For example, a background image of Paris may be used for a video conference with a family member, a solid background may be selected for secure business meetings, and/or a background blur may be used for less secure business meetings.

Figure 4:
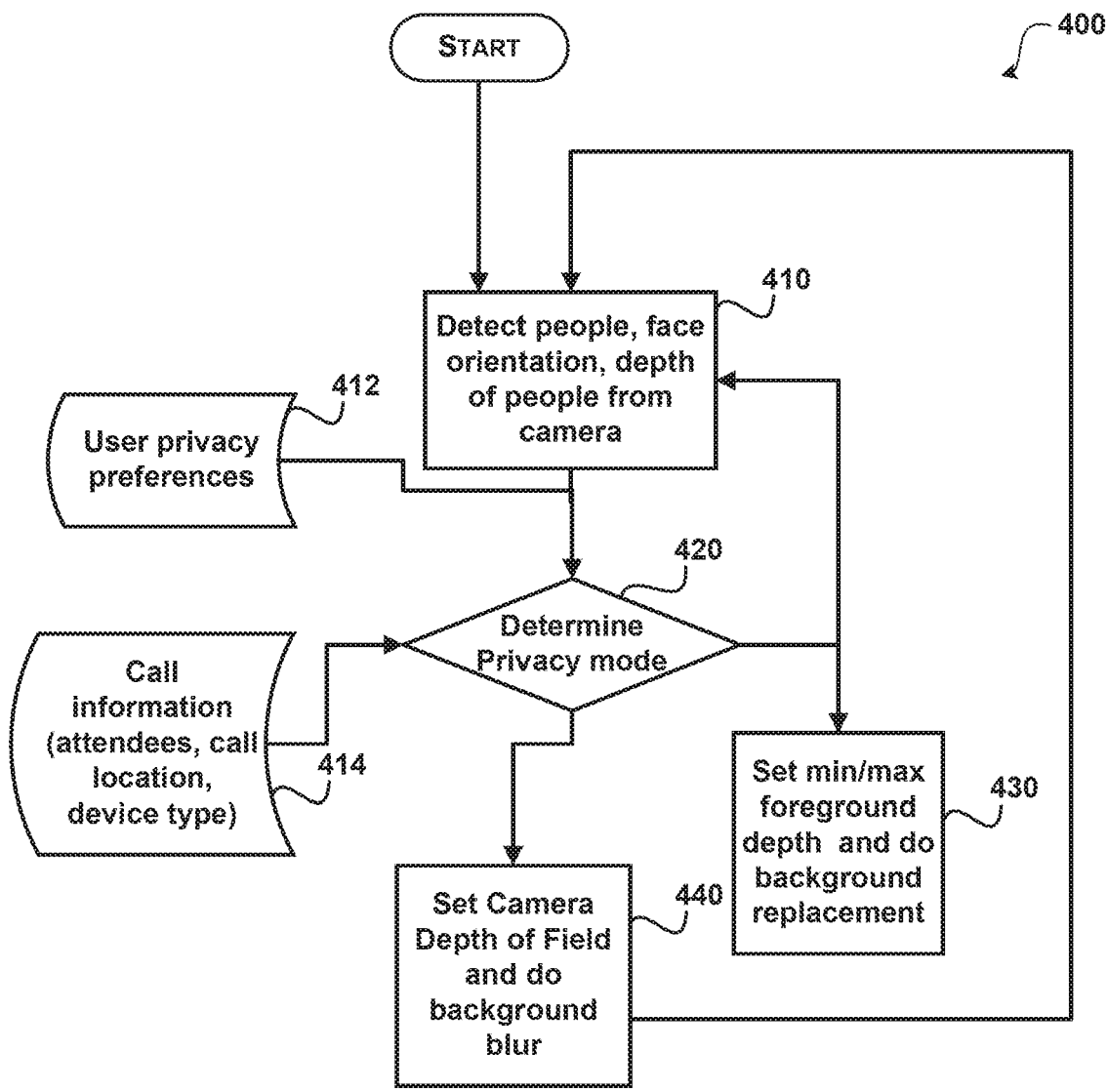
FIGS. 4 and 5 shows illustrative processes for using a camera device to create a privacy mode according to example embodiments.
Figure 5:
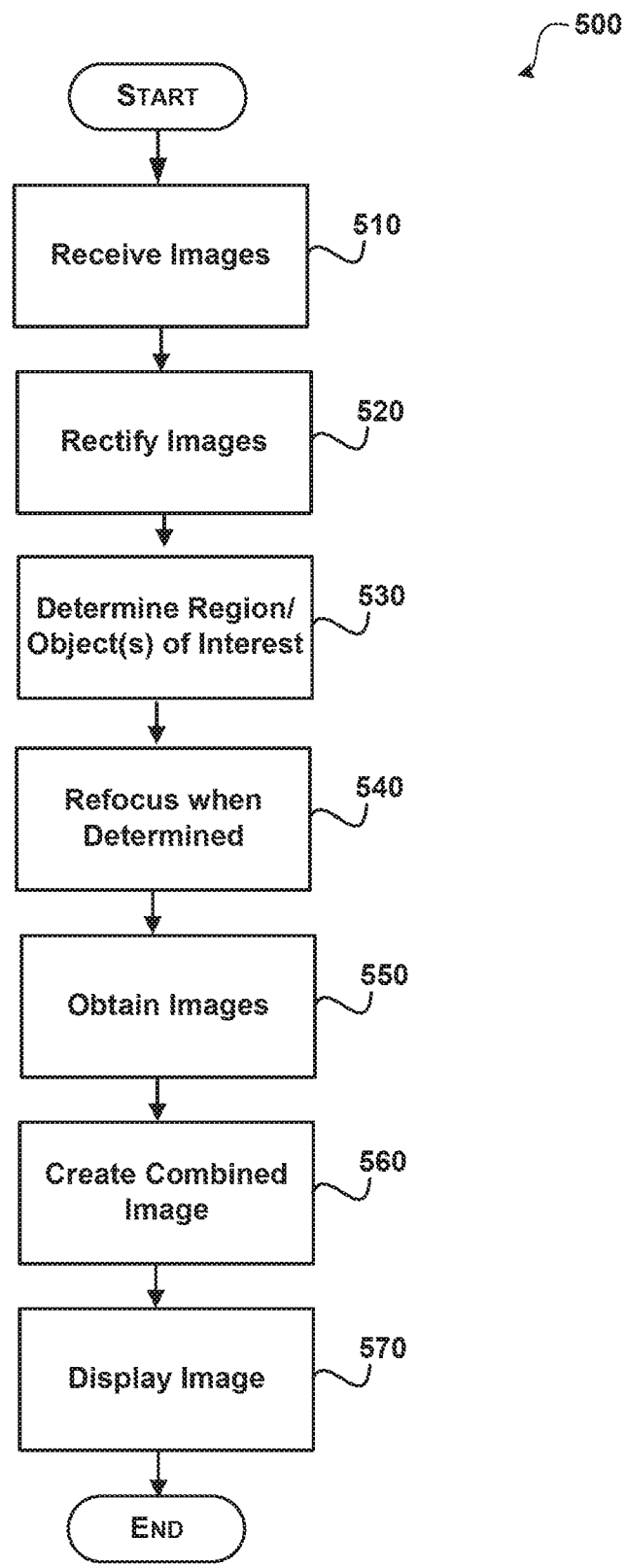

FIGS. 4 and 5 show illustrative processes 400 and 500 for using a camera device to create a privacy mode. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 4 shows an example of using a privacy camera using different privacy modes in a video conference.

After a start operation, the process moves to operation 410, where the people in the view are detected. For example, the depth of the people from the privacy camera may be determined, the orientation of their face may be determined, and the like. According to an embodiment, each user that is within a predetermined area (e.g. one or more persons within a predetermined distance of the privacy camera) and are participating in the video conference are determined.

Flowing to decision operation 420, a privacy mode is determined. The privacy mode may: blur the background; replace the background; or be off (e.g. no blurring or background replacement). The privacy mode may be determined manually/automatically. Different information may be used in determining the privacy mode selected. User privacy preferences 412 may include different preferences for one or more uses that define when to select a privacy mode and what image/fill to select when the privacy mode is set to background replacement. Call information 414 (e.g. attendees, call location, device type) may also be used in determining the privacy mode. For example, preferences 412 and/or call information 414 may specify that for: intra-company intra-group meetings use privacy mode M1; intra-company inter-group meetings use mode M2; inter-company meetings use mode M3; meetings with person X use mode M4; meetings from my smart phone use mode M5; personal calls from home use mode M6; and the like. According to an embodiment, each privacy mode can have custom blur settings and backgrounds (e.g., Paris for family member, solid background for secure business meetings, background blur for less secure business meetings, hatched background for business group meetings, . . . ).

When the privacy mode determined is background replacement, the process moves to operation 430, where the min/max foreground depth is determined and the background is replaced with an image and/or fill. For example, the foreground depths (min, max) may be determined automatically by detecting the person(s) participating in the video conference and/or manually by receiving the selections from a user. According to an embodiment, for background replacement the foreground/background segmentation is set dynamically based on number people in the field of view (FOV) and their respective depths using face detectors/person trackers and depth estimates. The determined background image/fill is used to replace the background that is not determined to be in the foreground.

When the privacy mode determined is background blur, the process moves to operation 440. After determining the foreground, the background is blurred. The background may be blurred different amounts (e.g. somewhat blurred to very blurred). According to an embodiment, when background blur is the privacy mode, the Depth of Field (DOF) is set dynamically based on the number of people in the FOV and their respective depths using face detectors/person trackers and depth estimates. The background blur and background replacement are performed differently by different types of privacy cameras. For example, light field cameras do not use depth for background blur but use depth information for background replacement whereas RGB+ depth cameras use depth for background blur and for background replacement.

FIG. 5 shows another process for using a privacy camera.

After a start operation, the process moves to operation 510, where images are received. According to an embodiment, the images are received from a light field (plenoptic) camera that uses a microlens array of cameras (e.g. 3×2, 3×3, . . . ) to capture a 4D light field of a scene. The cameras may be used for single image applications and/or multiple image applications (e.g. video conferencing). According to an embodiment, the cameras are low-cost and small such that the array of cameras may be included with a mobile personal computing device (e.g. notebook, slate, phone, . . . ).

Flowing to operation 520, the images are rectified to transform the obtained images to a common image to account for the spatial relationship of the cameras.

Moving to operation 530, one or more region/objects of interest are determined. For example, in a video conferencing application, a video conference participant is typically the object of interest. Generally, the region/object of interest is an object determined to have the cameras focused on. The region/object of interest may be determined automatically/manually. For example, a face detection and face orientation method may be used to automatically detect an object of interest (e.g. a person). A user may also select an object in an image to focus on (e.g. touch and/or some other input method).

Transitioning to operation 540, the privacy camera is refocused when determined. For example, when the privacy camera is a light camera, then no refocusing is conducted. When the privacy camera is an RGB+ depth camera (or some similar camera) then the camera(s) are refocused to focus on the determined region/object of interest.

Flowing to operation 550, the images are obtained.

Moving to operation 560, a combined image is created from the obtained images. The combined image creates a single image that clearly shows the object of interest (and other objects having a same focal length) with the objects not in focus shown blurry and/or replaced with a fill/background. The blur effect may be automatically created by the combination of the images from the cameras arranged in the array. Generally, changing a number of cameras in the array and/or changing the spatial relationship of the cameras changes the amount of blur in the combined image (e.g. more cameras usually creates more blur for objects not focused on).

Transitioning to operation 570, the image is displayed. According to an embodiment, the images are displayed in a video conferencing application.

The process then moves to an end operation and returns to processing other actions.

Figure 6:
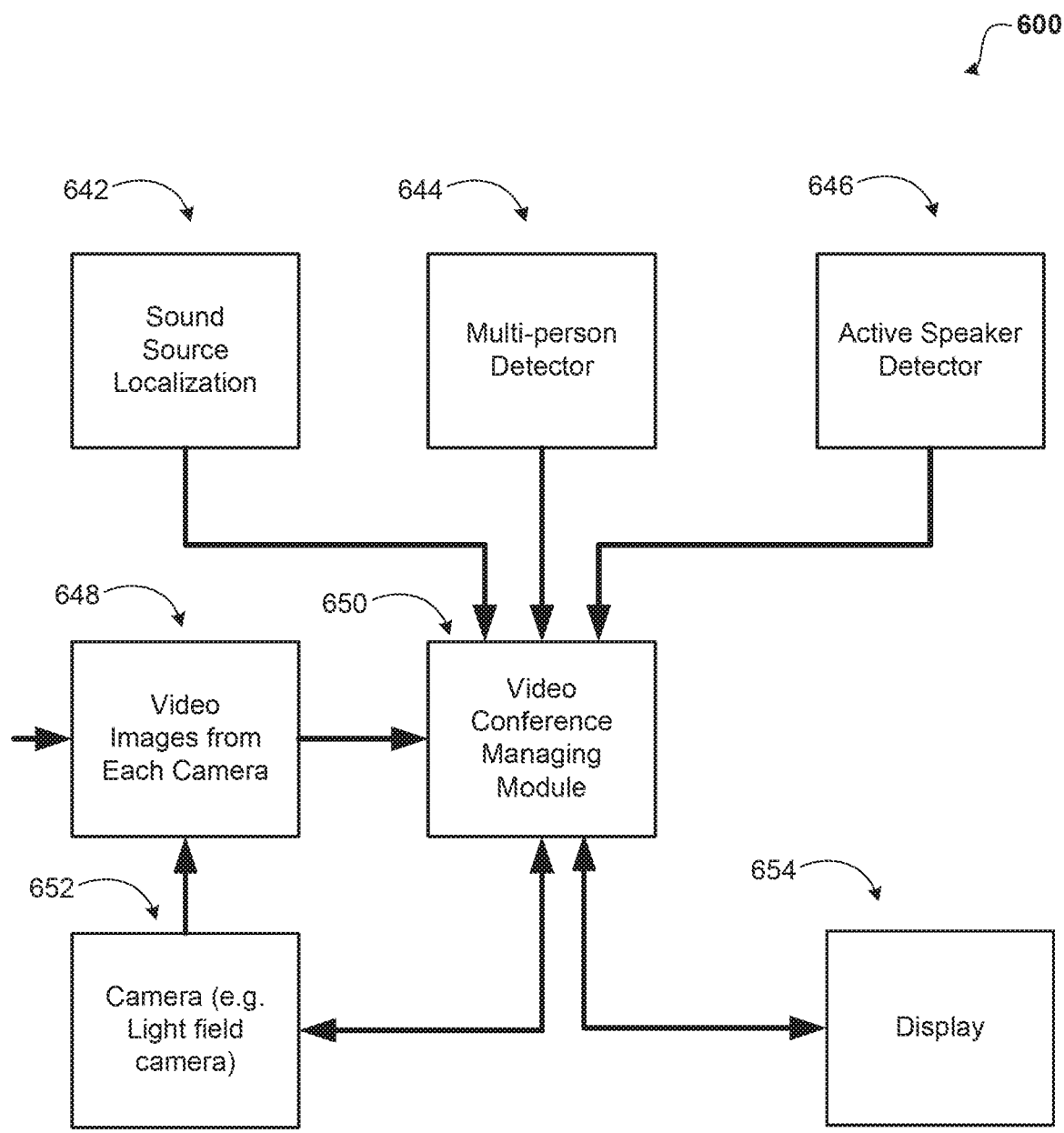
FIG. 6 illustrates a video conferencing system using a privacy image generation system according to example embodiments.

FIG. 6 illustrates a video conferencing system 600 using a privacy camera.

In a video capture system, one or more cameras 652 capture video images of participants in a video conference. Cameras 652 may be incorporated with a display 654 for showing a video signal, such as one or more incoming video feeds. According to an embodiment, at least one of the cameras is a light field camera that includes at least six cameras arranged in an array. A video conference managing module 650 may be used to manage the display and receipt/transmission of video images and may include the functionality of camera manager 26 as described herein. For example, module 650 may be used to select incoming video feeds. Module 650 may also be used to perform video processing on the incoming/outgoing video. For example, module 650 may be used to improve image quality such as enhancing a person or region of interest through adjustment of exposure and/or gain for that portion of the video frame. The sound source localization, multi-person, and active speaker detectors 642, 644, 646 use audio and/or visual cues to select a region of interest and/or an object of interest. Sound source localization detector 642 uses audio features such as sound detection from multiple microphones to detect the location of the speaker among multiple people. The multi-person detector 644 uses motion and image features (such as contours of a person, facial recognition, etc.) to determine the speaker. The active speaker detector 646 uses sound source localization, motion, and image features to detect the current speaker. Module 650 may determine to highlight a video display of an incoming feed on display 654 more often when the video feed shows the speaker. For example, the video feed of the speaker may be displayed larger on display 654 then the display of the other incoming feeds. The incoming video feeds may be shown one after another, layered, in a pattern, and the like, on display 654. According to one embodiment, the feeds to show on display 654 may be selected. Module 650 may be implemented as hardware, software, or a combination of the two.

Figure 7:
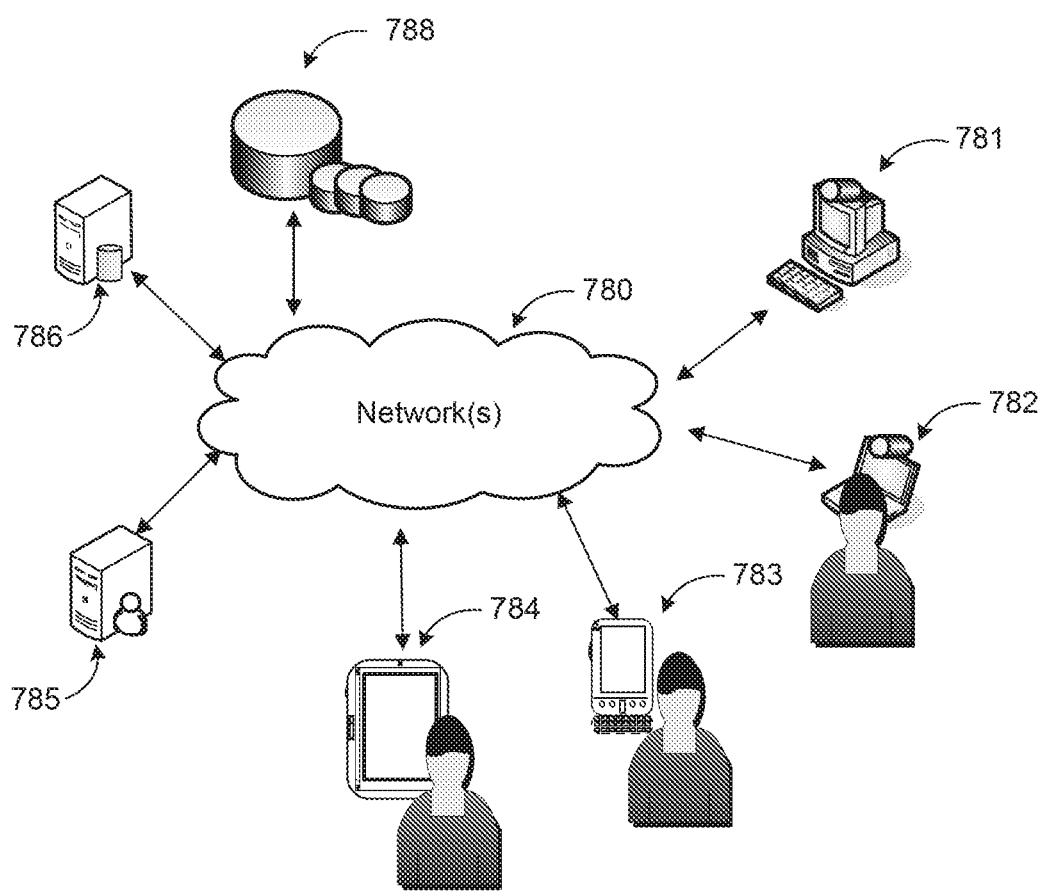
FIG. 7 shows a networked environment where embodiments may be implemented.

FIG. 7 shows a networked environment where embodiments may be implemented. One or more of the locations participating in the video conference may include a camera device as described above (e.g. 120).

Such a system may comprise any topology of servers, clients, Internet service providers, and communication media. Also, the system may have a static or dynamic topology. While a networked system implementing embodiments may involve many more components, relevant ones are discussed in conjunction with this figure.

Video conferencing applications may be executed and video rendered in devices 781-784. One or more of the devices may include a light field camera, and/or RGB+depth (structured light, stereo, time of flight) camera as described herein to create the privacy mode. According to another embodiment, a privacy mode may be created using a single camera that has an f/# less than or equal to about 1. For example, a 1080p webcam may include a lens with f/#<=1, an electromechanically adjustable aperture, an electromechanically adjustable focus and a VFOV=60° (e.g. to capture body gestures). The camera may also include a range finder (e.g. ultrasonic). A lens with a low f/# has a small depth of field (DOF). The DOF can be adjusted using an aperture such that the camera can have a "normal mode" with a large DOF, and a "privacy mode" with a small DOF. Using the privacy mode (e.g. f/#<=1) increases the SNR since a lens with a smaller f/# gets more light then a lens with a higher f/#.

If the video application is part of a communication application (or service), the application or service may be managed by one or more servers (e.g. server 785). A portion or all of the generated video may be stored instead of being instantaneously rendered. In that scenario, the video files may be stored in a data store such as data stores 788 and provided to the video application(s) in devices subsequently through database server 786 or retrieved directly by the video application(s).

Network(s) 780 may include a secure network such as an enterprise network, an unsecure network such as a wireless open network, or the Internet Network(s) 780 provide communication between the nodes described herein. By way of example, and not limitation, network(s) 780 may include wired media such as a wired network or direct-wired connection, and wireless media such as acoustic, RF, infrared and other wireless media.

Many other configurations of computing devices, applications, data sources, data distribution systems may be employed to implement a video conferencing system. Furthermore, the networked environments discussed in FIG. 7 are for illustration purposes only. Embodiments are not limited to the example applications, modules, or processes.

Figure 8:
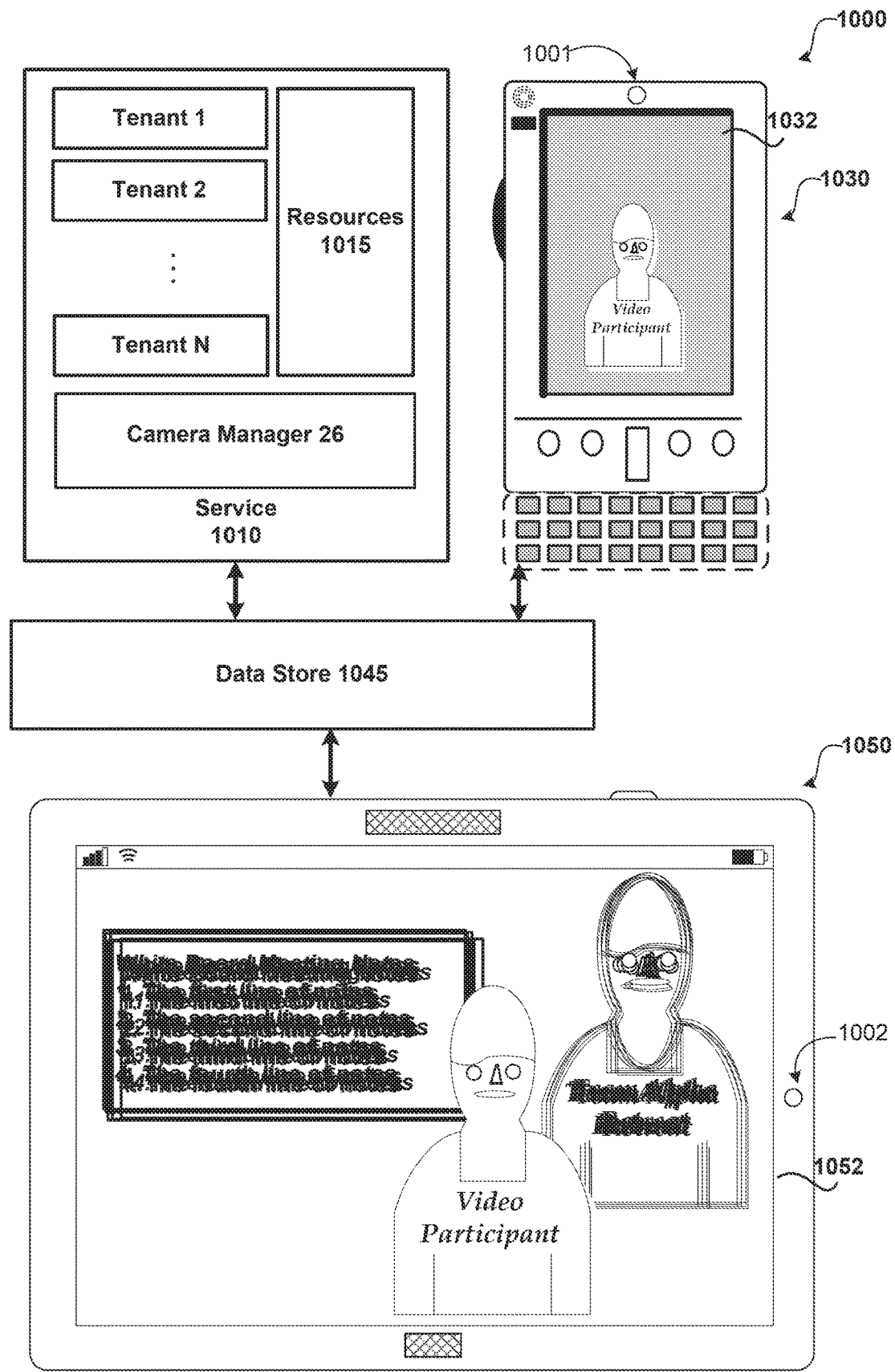
FIG. 8 illustrates an example system for a privacy image generation system.

FIG. 8 illustrates an exemplary system using a privacy camera. As illustrated, system 1000 includes service 1010, data store 1045, touch screen input device/display 1050 (e.g. a slate) including privacy camera 1002 and smart phone 1030 including privacy camera 1001.

As illustrated, service 1010 is a cloud based and/or enterprise-based service that may be configured to provide services, such as video conferencing services (e.g. MICROSOFT LYNC, SKYPE), electronic messaging services (e.g. MICROSOFT EXCHANGE/OUTLOOK), productivity services (e.g. MICROSOFT OFFICE 365 or some other cloud based/online service. The service may be interacted with using different types of input/output. For example, a user may use touch input, hardware-based input, speech input, and the like. The service may provide speech output that combines pre-recorded speech and synthesized speech. Functionality of one or more of the services/applications provided by service 1010 may also be configured as a client/server based application. Although system 1000 shows a service relating to a messaging application, other services/applications may be configured.

As illustrated, service 1010 is a multi-tenant service that provides resources 1015 and services to any number of tenants (e.g. Tenants 1–N), Multi-tenant service 1010 is a cloud-based service that provides resources/services 1015 to tenants subscribed to the service and maintains each tenant's data separately and protected from other tenant data.

System 1000 as illustrated comprises a touch screen input device/display 1050 (e.g. a slate/tablet device) and smart phone 1030 that detects when a touch input has been received (e.g. a finger touching or nearly touching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

According to an embodiment, smart phone 1030 and touch screen input device/display 1050 are configured with video applications that utilize a privacy camera as described herein.

As illustrated, touch screen input device/display 1050 and smart phone 1030 shows exemplary displays 1052/1032 showing the use of a video conferencing application. Display 1052 shows a privacy view created from images of a privacy camera in which the video participant is clearly shown and the background objects are blurred. Display 1032 shows a privacy view created using a privacy camera in which the video participant is clearly shown and the background is replaced with an image/fill. Data may be stored on a device (e.g. smart phone 1030, slate 1050 and/or at some other location (e.g. network data store 1045). The applications used by the devices may be client-based applications, server-based applications, cloud-based applications and/or some combination.

Camera manager 26 is configured to perform operations relating to creating a privacy view as described herein. While manager 26 is shown within service 1010, the functionality of the manager may be included in other locations (e.g. on smart phone 1030 and/or slate device 1050).

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
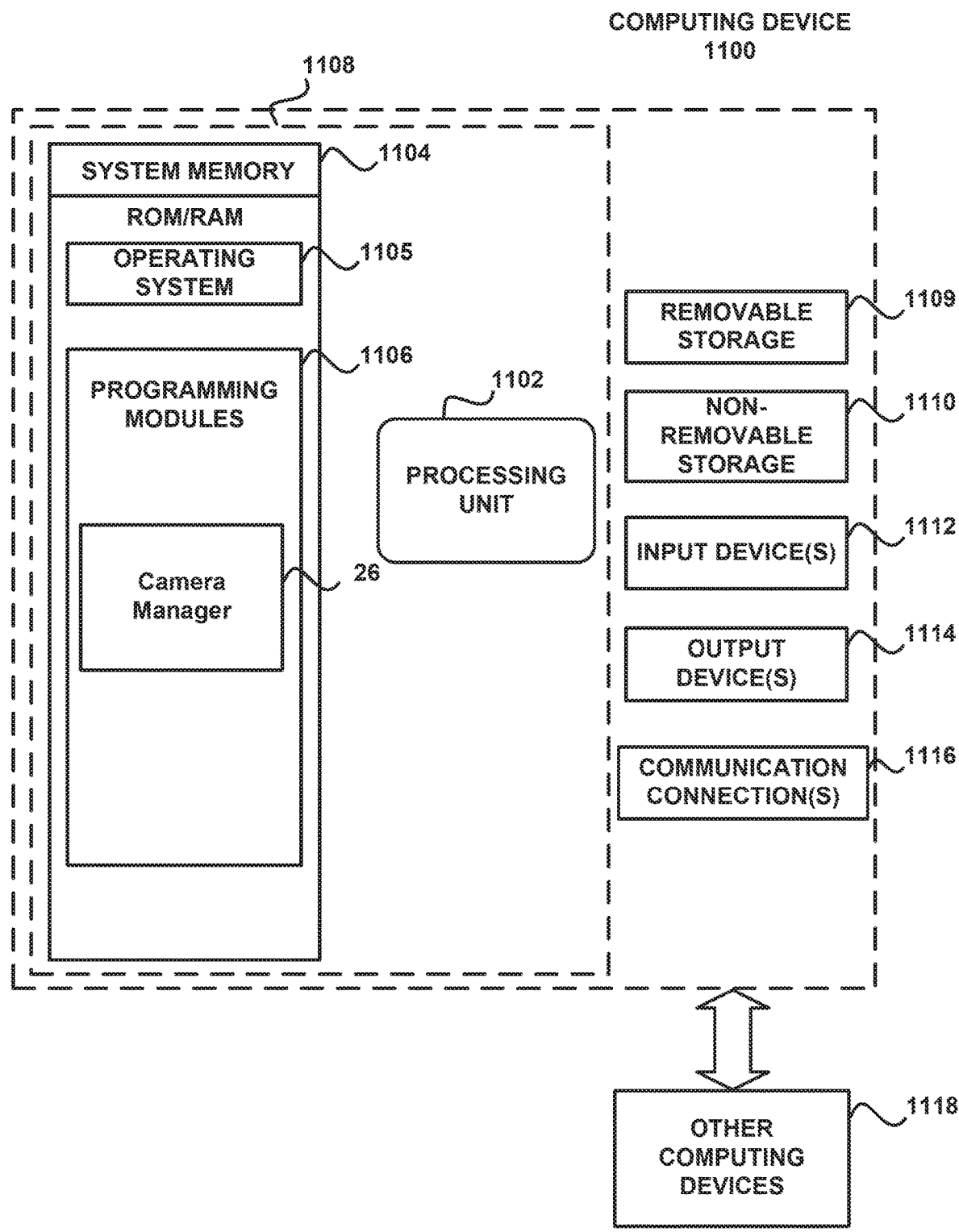
FIGS. 9, 10A, 10B and 11 and the associated descriptions provide a discussion of a variety of operating environments in which embodiments of the invention may be practiced.
Figure 10A:
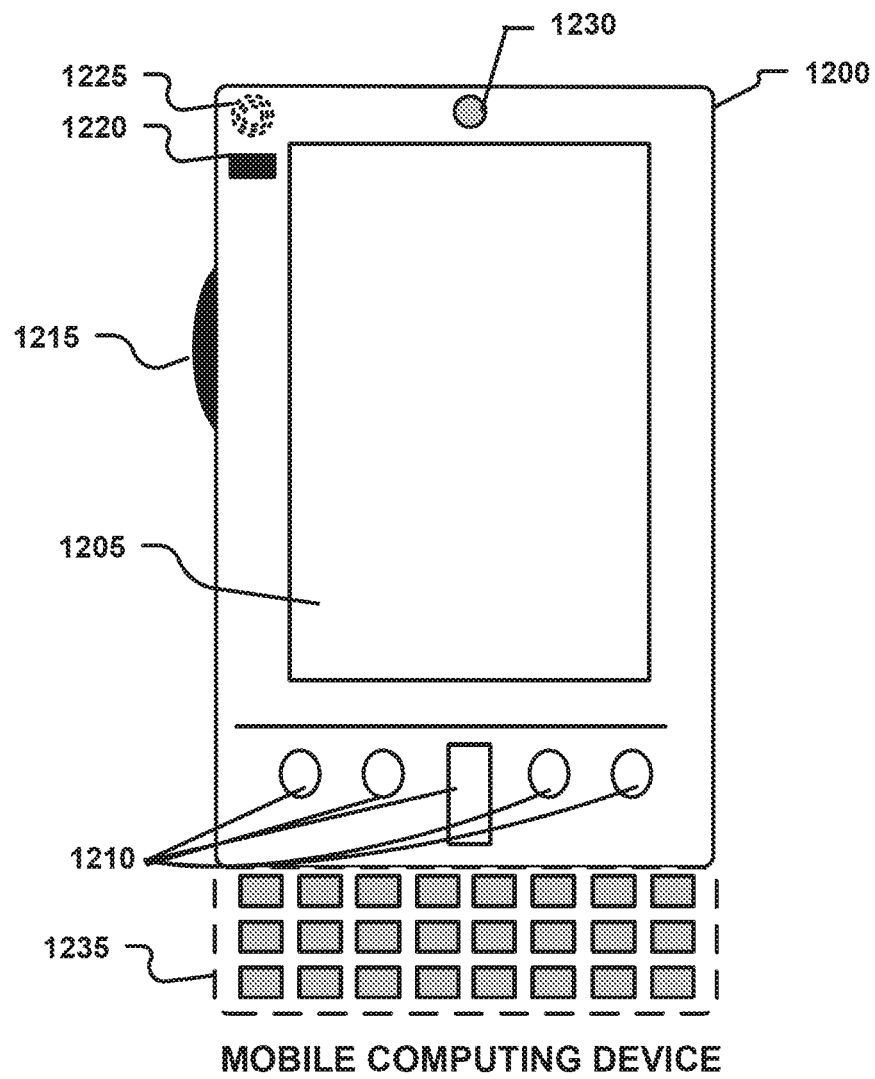
Figure 10B:
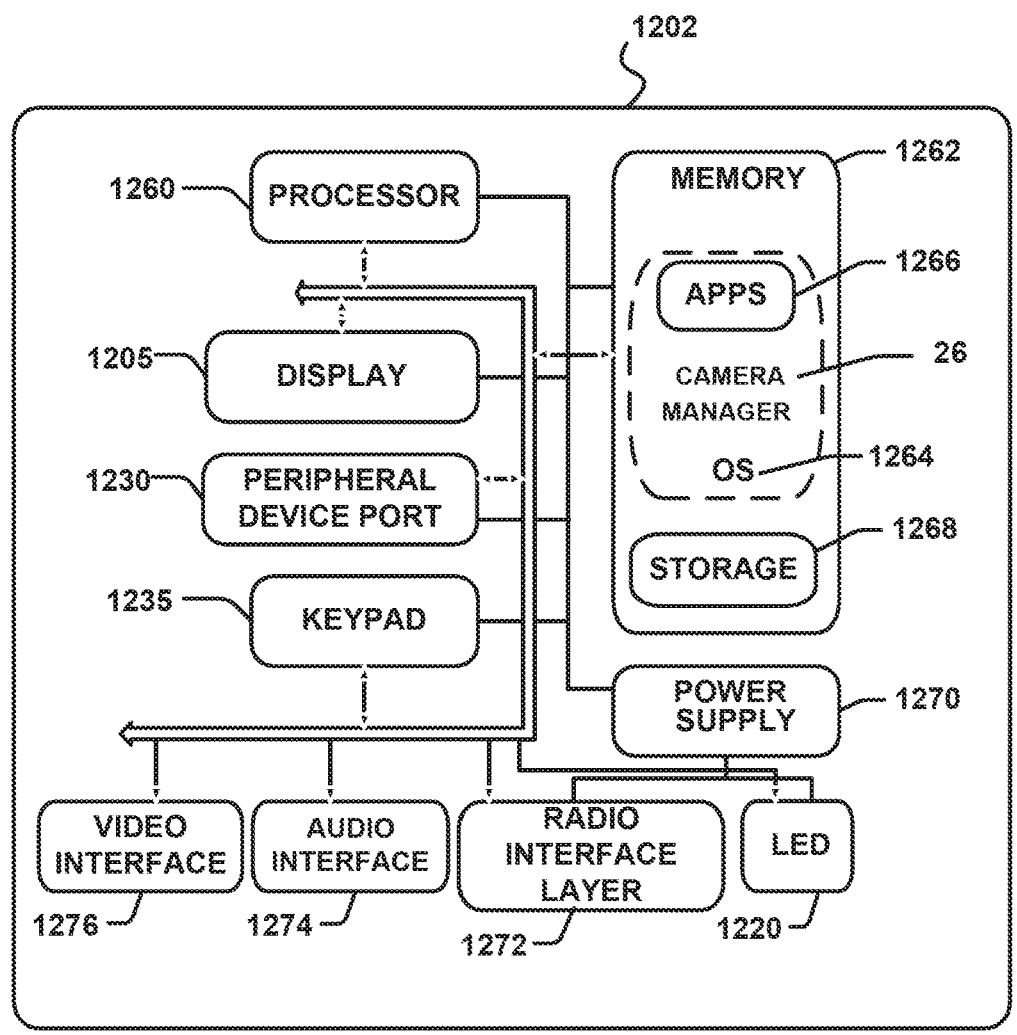
Figure 11:
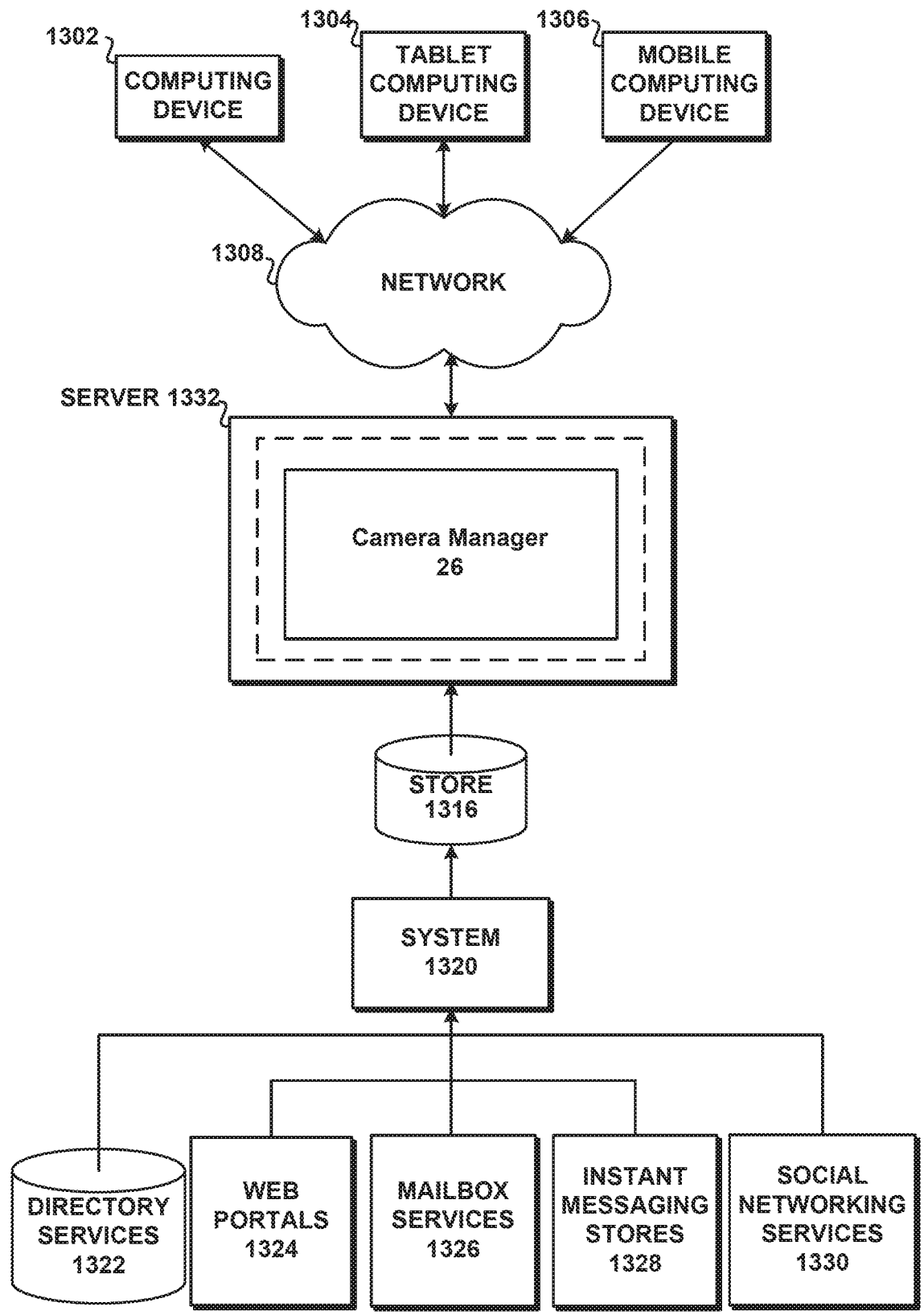

FIGS. 9-11 and the associated descriptions provide a discussion of a variety of operating environments in which embodiments of the invention may be practiced. However, the devices and systems illustrated and discussed with respect to FIGS. 9-11 are for purposes of example and illustration and are not limiting of a vast number of computing device configurations that may be utilized for practicing embodiments of the invention, described herein.

FIG. 9 is a block diagram illustrating example physical components of a computing device 1100 with which embodiments of the invention may be practiced. The computing device components described below may be suitable for the computing devices described above. In a basic configuration, computing device 1100 may include at least one processing unit 1102 and a system memory 1104. Depending on the configuration and type of computing device, system memory 1104 may comprise, but is not limited to, volatile (e.g. random access memory (RAM)), non-volatile (e.g. read-only memory (ROM)), flash memory, or any combination. System memory 1104 may include operating system 1105, one or more programming modules 1106, and may include a web browser application 1120. Operating system 1105, for example, may be suitable for controlling computing device 1100's operation. In one embodiment, programming modules 1106 may include a camera manager 26, as described above, installed on computing device 1100. Furthermore, embodiments of the invention may be practiced in conjunction with a graphics library, other operating systems, or any other application program and is not limited to any particular application or system. This basic configuration is illustrated in FIG. 9 by those components within a dashed line 1108.

Computing device 1100 may have additional features or functionality. For example, computing device 1100 may also include additional data storage devices (removable and/or non-removable) such as, for example, magnetic disks, optical disks, or tape. Such additional storage is illustrated by a removable storage 1109 and a non-removable storage 1110.

As stated above, a number of program modules and data files may be stored in system memory 1104, including operating system 1105. While executing on processing unit 1102, programming modules 1106, such as the manager may perform processes including, for example, operations related to methods as described above. The aforementioned process is an example, and processing unit 1102 may perform other processes. Other programming modules that may be used in accordance with embodiments of the present invention may include video conferencing applications, imaging applications, electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the manager 26 may be operated via application-specific logic integrated with other components of the computing device/system 1100 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media. Computer storage media may include volatile and nonvolatile, removable and non-removable media implemented in any method or technology for storage of information, such as computer readable instructions, data structures, program modules, or other data. System memory 1104, removable storage 1109, and non-removable storage 1110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1100. Any such computer storage media may be part of device 1100. Computing device 1100 may also have input device(s) 1112 such as a keyboard, a mouse, a pen, a sound input device, a touch input device, etc. Output device(s) 1114 such as a display, speakers, a printer, etc. may also be included. The aforementioned devices are examples and others may be used.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones. The camera may also be a light field camera as described herein.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 10A and 10B illustrate a suitable mobile computing environment, for example, a mobile telephone, a smartphone, a tablet personal computer, a laptop computer, and the like, with which embodiments of the invention may be practiced. With reference to FIG. 10A, an example mobile computing device 1200 for implementing the embodiments is illustrated. In a basic configuration, mobile computing device 1200 is a handheld computer having both input elements and output elements. Input elements may include touch screen display 1205 and input buttons 1215 that allow the user to enter information into mobile computing device 1200. Mobile computing device 1200 may also incorporate an optional side input element 1215 allowing further user input. Optional side input element 1215 may be a rotary switch, a button, or any other type of manual input element. In alternative embodiments, mobile computing device 1200 may incorporate more or less input elements. For example, display 1205 may not be a touch screen in some embodiments. In yet another alternative embodiment, the mobile computing device is a portable phone system, such as a cellular phone having display 1205 and input buttons 1215. Mobile computing device 1200 may also include an optional keypad 1235. Optional keypad 1215 may be a physical keypad or a "soft" keypad generated on the touch screen display.

Mobile computing device 1200 incorporates output elements, such as display 1205, which can display a graphical user interface (GUI). Other output elements include speaker 1225 and LED light 1220. Additionally, mobile computing device 1200 may incorporate a vibration module (not shown), which causes mobile computing device 1200 to vibrate to notify the user of an event. In yet another embodiment, mobile computing device 1200 may incorporate a headphone jack (not shown) for providing another means of providing output signals.

Although described herein in combination with mobile computing device 1200, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

FIG. 10B is a block diagram illustrating components of a mobile computing device used in one embodiment, such as the computing device shown in FIG. 10A. That is, mobile computing device 1200 can incorporate system 1202 to implement some embodiments. For example, system 1202 can be used in implementing a "smart phone" that can run one or more applications similar to those of a desktop or notebook computer such as, for example, presentation applications, browser, e-mail, scheduling, instant messaging, and media player applications. In some embodiments, system 1202 is integrated as a computing device, such as an integrated personal digital assistant (PD) and wireless phoneme.

One or more application programs 1266 may be loaded into memory 1262 and run on or in association with operating system 1264. Examples of application programs include phone dialer programs, e-mail programs, PIM (personal information management) programs, word processing programs, spreadsheet programs, Internet browser programs, messaging programs, and so forth. System 1202 also includes non-volatile storage 1268 within memory 1262. Non-volatile storage 1268 may be used to store persistent information that should not be lost if system 1202 is powered down. Applications 1266 may use and store information in non-volatile storage 1268, such as e-mail or other messages used by an e-mail application, and the like. A synchronization application (not shown) may also reside on system 1202 and is programmed to interact with a corresponding synchronization application resident on a host computer to keep the information stored in non-volatile storage 1268 synchronized with corresponding information stored at the host computer. As should be appreciated, other applications may be loaded into memory 1262 and run on the device 1200, including the camera manager 26, described above.

System 1202 has a power supply 1270, which may be implemented as one or more batteries. Power supply 1270 might further include an external power source, such as an AC adapter or a powered docking cradle that supplements or recharges the batteries.

System 1202 may also include a radio 1272 that performs the function of transmitting and receiving radio frequency communications. Radio 1272 facilitates wireless connectivity between system 1202 and the "outside world", via a communications carrier or service provider. Transmissions to and from radio 1272 are conducted under control of OS 1264. In other words, communications received by radio 1272 may be disseminated to application programs 1266 via OS 1264, and vice versa.

Radio 1272 allows system 1202 to communicate with other computing devices, such as over a network. Radio 1272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 1202 is shown with two types of notification output devices; LED 1220 that can be used to provide visual notifications and an audio interface 1274 that can be used with speaker 1225 to provide audio notifications. These devices may be directly coupled to power supply 1270 so that when activated, they remain on for a duration dictated by the notification mechanism even though processor 1260 and other components might shut down for conserving battery power. LED 1220 may be programmed to remain on indefinitely until the user takes action to indicate the powered-on status of the device. Audio interface 1274 is used to provide audible signals to and receive audible signals from the user. For example, in addition to being coupled to speaker 1225, audio interface 1274 may also be coupled to a microphone 1220 to receive audible input, such as to facilitate a telephone conversation. In accordance with embodiments of the present invention, the microphone 1220 may also serve as an audio sensor to facilitate control of notifications, as will be described below. System 1202 may further include video interface 1276 that enables an operation of on-board camera 1230 (e.g. camera 120) to record still images, video stream, and the like.

A mobile computing device implementing system 1202 may have additional features or functionality. For example, the device may also include additional data storage devices (removable and/or non-removable) such as, magnetic disks, optical disks, or tape. Such additional storage is illustrated in FIG. 10B by storage 1268. Computer storage media may include volatile and nonvolatile, removable and non-removable media implemented in any method or technology for storage of information, such as computer readable instructions, data structures, program modules, or other data.

Data/information generated or captured by the device 1200 and stored via the system 1202 may be stored locally on the device 1200, as described above, or the data may be stored on any number of storage media that may be accessed by the device via the radio 1272 or via a wired connection between the device 1200 and a separate computing device associated with the device 1200, for example, a server computer in a distributed computing network such as the Internet. As should be appreciated such data/information may be accessed via the device 1200 via the radio 1272 or via a distributed computing network. Similarly, such data/information may be readily transferred between computing devices for storage and use according to well-known data/information transfer and storage means, including electronic mail and collaborative data/information sharing systems.

FIG. 11 illustrates a system architecture for using a privacy camera.

Components managed via the camera manager 26 and/or other process may be stored in different communication channels or other storage types. For example, components along with information from which they are developed may be stored using directory services 1322, web portals 1324, mailbox services 1326, instant messaging stores 1328 and social networking sites 1330. The systems/applications 26, 1320 may use any of these types of systems or the like for enabling management and storage of components in a store 1316. A server 1332 may provide communications and services relating to video conferencing and/or other imaging services. Server 1332 may provide services and content over the web to clients through a network 1308. Examples of clients that may utilize server 1332 include computing device 1302, which may include any general purpose personal computer, a tablet computing device 1304 and/or mobile computing device 1306 which may include smart phones. Each of these devices may include a camera that includes a privacy mode as described herein. Any of these devices may obtain display component management communications and content from the store 1316.

Embodiments of the present invention are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A video image processing method for adding privacy effects to a display video image of a scene, the method comprising:
   obtaining a plurality of input video images of the scene from a corresponding plurality of video cameras that are spaced apart;
   determining a region of interest, including an image of an object, in each of the plurality of input video images to define a foreground and a background, the foreground including the image of the object;
   rectifying the plurality of input video images based on the image of the object in each input video image to produce a plurality of rectified video images having aligned foregrounds and having backgrounds that are not aligned due to relative spatial relationships of the plurality of video cameras corresponding to the plurality of input video images;
   creating the display video image by combining the plurality of rectified video images, the foreground of the display video image being in-focus and the background of the display video image appearing to be blurred due to the backgrounds of the rectified video images not being aligned; and
   transmitting the display video image for display.

2. The method of claim 1, further comprising receiving an indication of an amount of blur to apply to the display video image, wherein the obtaining of the plurality of input video images includes selecting a number of input video images as the plurality of input video images in response to the indication of the amount of blur.

3. The method of claim 1, further comprising receiving an indication of an amount of blur to apply to the display video image, wherein the obtaining of the plurality of input video images includes selecting the plurality of input video images based on the relative spatial relationships of the cameras corresponding to the plurality of input video images in response to the indication of the amount of blur.

4. The method of claim 1, further comprising:
   providing one video image of the plurality of input video images for display;
   wherein determining the region of interest includes receiving an indication of a portion of the one video image as an indication of the image of the object in the region of interest.

5. The method of claim 1, wherein:
   the obtaining of the plurality of input video images includes receiving the plurality of input video images from a client device via a network; and
   the transmitting of the display video image for display includes transmitting the display video image to the client device via the network.

6. The method of claim 1, further comprising:
   receiving data representing a plurality of audio signals corresponding to a voice of a presenter;
   wherein:
      the determining of the region of interest includes determining the region of interest using sound source localization based on the plurality of audio signals; and
      the image of the object includes an image of the presenter.

7. The method of claim 1, wherein determining the region of interest includes processing at least two of the plurality of input video images to estimate a depth of the region of interest, wherein the background includes objects in the plurality of input video images having depths greater that the estimated depth of the region of interest.

8. An image processing system for adding privacy effects to a display video image, the system comprising:
   a processor; and
   a memory storing computer executable instructions configured to cause the processor to:
      obtain a plurality of input video images of a scene from a corresponding plurality of video cameras that are spaced apart;
      determine a region of interest, including an image of an object, in each of the plurality of input video images to define a foreground and a background, the foreground including the image of the object;
      rectify the plurality of input video images based on the image of the object in each input video image to produce a plurality of rectified video images having aligned foregrounds and having backgrounds that are not aligned due to relative spatial relationships of the plurality of video cameras corresponding to the plurality of input video images;
      create the display video image by combining the plurality of rectified video images, the foreground of the display video image being in-focus and the background of the display video image appearing to be blurred due to backgrounds of the rectified video images not being aligned; and
      transmit the display video image for display.

9. The image processing system of claim 8, wherein:
   the computer executable instructions are further configured to cause the processor to receive an indication of an amount of blur to apply to the display video image; and
   the computer executable instructions that cause the processor to obtain the plurality of input video images include instructions that cause the processor to select a number of input video images as the plurality of input video images in response to the indication of the amount of blur.

10. The image processing system of claim 8, wherein:
the computer executable instructions are further configured to cause the processor to receive an indication of an amount of blur to apply to the display video image; and
the computer executable instructions that cause the processor to obtain the plurality of input video images include instructions that cause the processor to select the plurality of input video images based on the relative spatial relationships of the video cameras corresponding to the selected plurality of input video images in response to the indication of the amount of blur.

11. The image processing system of claim 8, further comprising computer executable instructions that cause the processor to:
provide one video image of the plurality of input video images for display;
wherein the computer executable instructions that cause the processor to determine the region of interest include instructions that cause the processor to receive an indication of a portion of the one video image as an indication the image of the object in the region of interest.

12. The image processing system of claim 8, wherein:
the computer executable instructions that cause the processor to obtain the plurality of input video images include instructions that cause the processor to receive the plurality of input video images from a client device via a network; and
the computer executable instructions that cause the processor to transmit the display video image for display include instructions that cause the processor to transmit the display video image to the client device via the network.

13. The image processing system of claim 8, further comprising:
computer executable instructions that cause the processor to receive data representing a plurality of audio signals corresponding to a voice of a presenter;
wherein:
the computer executable instructions that cause the processor to determine the region of interest include instructions that cause the processor to determine the region of interest using sound source localization based on the plurality of audio signals; and
the image of the object includes an image of the presenter.

14. The image processing system of claim 8, wherein:
the computer executable instructions that cause the processor to determine the region of interest include instructions that cause the processor to estimate a depth of the region of interest based on at least two input video images of the plurality of input video images; and
the background includes objects in the plurality of input video images having depths greater that the estimated depth of the region of interest.

15. An apparatus for adding privacy effects to a display image of a scene comprising:
means for obtaining a plurality of input video images of the scene from a corresponding plurality of video cameras that are spaced apart;
means for determining a region of interest, including an image of an object, in each of the plurality of input video images to define a foreground and a background, the foreground including the image of the object;
means for rectifying the plurality of input video images based on the image of the object in each input video image to produce a plurality of rectified video images having aligned foregrounds and having backgrounds that are not aligned due to relative spatial relationships of the plurality of video cameras corresponding to the plurality of input video images;
means for creating the display video image by combining the plurality of rectified video images, the foreground of the display video image being in-focus and the background of the display video image appearing to be blurred due to the backgrounds of the rectified video images not being aligned; and
means for transmitting the display video image for display.

16. The apparatus of claim 15, further comprising:
means for receiving an indication of an amount of blur to apply to the display video image, wherein the means for obtaining the plurality of input video images includes means for selecting a number of input video images as the plurality of input video images in response to the indication of the amount of blur.

17. The apparatus of claim 15, further comprising:
means for receiving an indication of an amount of blur to apply to the display video image, wherein the means for obtaining the plurality of input video images includes means for selecting the plurality of input video images based on the relative spatial relationships of the video cameras corresponding to the plurality of input video images in response to the indication of the amount of blur.

18. The apparatus of claim 15, wherein the means for determining the region of interest includes means for receiving an indication of a portion of at least one input video image of the plurality of input video images as an indication of the image of the object in the region of interest.

19. The apparatus of claim 15, further comprising:
means for receiving data representing a location of a presenter;
wherein:
the means for determining of the region of interest includes means for determining the region of interest responsive to the location of the presenter; and
the image of the object includes an image of the presenter.

20. The apparatus of claim 15, wherein the means for determining the region of interest includes means for estimating a depth of the region of interest, wherein the background includes objects in the plurality of input video images having depths greater that the estimated depth of the region of interest.

* * * * *